United States Patent
Fushiki

(10) Patent No.: US 10,272,813 B2
(45) Date of Patent: Apr. 30, 2019

(54) HOIST DEVICE FOR DUMP TRUCK

(71) Applicant: Hitachi Construction Machinery Co., Ltd., Taito-ku, Tokyo (JP)

(72) Inventor: Michio Fushiki, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 177 days.

(21) Appl. No.: 15/121,410

(22) PCT Filed: Feb. 13, 2015

(86) PCT No.: PCT/JP2015/054043
§ 371 (c)(1),
(2) Date: Aug. 25, 2016

(87) PCT Pub. No.: WO2015/146358
PCT Pub. Date: Oct. 1, 2015

(65) Prior Publication Data
US 2016/0362034 A1 Dec. 15, 2016

(30) Foreign Application Priority Data
Mar. 28, 2014 (JP) .............................. 2014-069869

(51) Int. Cl.
*F15B 11/08* (2006.01)
*B60P 1/16* (2006.01)
(Continued)

(52) U.S. Cl.
CPC .............. *B60P 1/162* (2013.01); *F15B 11/08* (2013.01); *F15B 13/0401* (2013.01);
(Continued)

(58) Field of Classification Search
CPC .. F15B 13/0401; F15B 11/028; F15B 13/044; F15B 11/08; B60P 1/04; B60P 1/162
See application file for complete search history.

(56) References Cited

U.S. PATENT DOCUMENTS 6,568,763 B2 * 5/2003 Uematsu ................. B60P 1/162
298/22 C
7,740,323 B2 * 6/2010 Kaneko ................... B60P 1/162
298/22 C
(Continued)

FOREIGN PATENT DOCUMENTS

JP 2001-105954 A 4/2001
JP 4324582 B2 6/2009

OTHER PUBLICATIONS

International Search Report (PCT/ISA/210) issued in PCT Application No. PCT/JP2015/054043 dated Mar. 24, 2015, with English translation (two (2) pages).

*Primary Examiner* — Michael Leslie
*Assistant Examiner* — Abiy Teka
(74) *Attorney, Agent, or Firm* — Crowell & Moring LLP

(57) ABSTRACT

One 3-position selector valve is used as a main control valve that controls hoist cylinders. A control valve is provided for supplying hydraulic oil from a low-pressure hydraulic pressure source to rod chambers of the hoist cylinders upon lowering a vessel. Provided between the rod chambers of the hoist cylinders and an oil tank is a check valve that enables to supply hydraulic oil from the oil tank to the rod chambers upon a vessel FLOAT operation. When an operation command from a control device is a vessel-lowering command, a controller switches the main control valve to a FLOAT position, and also switches the vessel LOWER operation control valve and supplies hydraulic oil of a low pressure from the low-pressure hydraulic pressure source to the rod chambers of the hoist cylinders.

3 Claims, 5 Drawing Sheets

(51) Int. Cl.
*F15B 13/044* (2006.01)
*F15B 13/04* (2006.01)
*B60P 1/04* (2006.01)
*F15B 13/02* (2006.01)

(52) U.S. Cl.
CPC .............. *F15B 13/044* (2013.01); *B60P 1/04* (2013.01); *F15B 13/024* (2013.01); *F15B 2013/0412* (2013.01); *F15B 2211/205* (2013.01); *F15B 2211/20538* (2013.01); *F15B 2211/255* (2013.01); *F15B 2211/30565* (2013.01); *F15B 2211/3127* (2013.01); *F15B 2211/50554* (2013.01); *F15B 2211/611* (2013.01); *F15B 2211/6346* (2013.01); *F15B 2211/6355* (2013.01); *F15B 2211/7057* (2013.01); *F15B 2211/7128* (2013.01)

(56) References Cited

U.S. PATENT DOCUMENTS 8,840,189 B2 * 9/2014 Minoshima ............. B60P 1/162
298/22 R
2009/0102273 A1 4/2009 Kaneko et al.

* cited by examiner

HOIST DEVICE FOR DUMP TRUCK

TECHNICAL FIELD

This invention relates to a hoist system for rotating a vessel up and down of a dump truck with the vessel rotated pivotally up and down by hoist cylinders, which are composed of hydraulic cylinders, pivoted to a pivot portion on a rear part of a vehicle body.

BACKGROUND ART

A dump truck mounts a vessel pivotally up and down pivoted to a pivot portion provided on a rear part of a vehicle body and providing, as means for rotating the vessel up and down, hoist cylinders, which are composed of hydraulic cylinders, pivoted between the vehicle body and the vessel. Using, as a hydraulic pressure source, a hydraulic pump driven by a prime mover, such as an engine, mounted on the dump truck, and switching an oil passage between the hydraulic pump and the hoist cylinders by a main control valve, the hoist cylinders are allowed to extend or retract.

As regards operation modes of the vessel, there are a RAISE operation, a HOLD operation, a FLOAT operation, and a LOWER operation. The RAISE operation is an operation that by supplying hydraulic oil to bottom chambers of the hoist cylinders, the hoist cylinders are allowed to extend to raise the vessel. The HOLD operation is an operation that the vessel is held in a current posture by cutting off hydraulic circuits, which lead to the hydraulic pump and an oil tank, relative to the rod chambers and bottom chambers of the hoist cylinders. The FLOAT operation means an operation that allows the vessel to descend by its own weight by having the rod chambers and bottom chambers of the hoist cylinders short-circuited through the main control valve. The LOWER operation means an operation that forcedly lowers the vessel by supplying hydraulic oil to the rod chambers of the hoist cylinders. This LOWER operation is performed when the vessel does not descend by its weight on such an uphill or the like that the dump truck becomes high at its front part.

As conventional hoist systems for performing such four operations, there are one described in Patent Document 1 and another one described in Patent Document 2. The hoist system described in Patent Document 1 includes one directional control valve as a main control valve. This directional control valve is composed of a 4-position selector valve, with a RAISE position where a RAISE operation is performed, a HOLD position where a HOLD operation is performed, a FLOAT position where a FLOAT operation is performed, and a LOWER position where a LOWER operation is performed, being arranged in this order. Of these four positions, the HOLD position is a neutral position, the RAISE position is a switched position on a side opposite to the FLOAT position and LOWER position, and the FLOAT position is located between the HOLD position and the LOWER position. This 4-position selector valve is switched in the same direction for the FLOAT position and LOWER position, so that a common pilot pressure receiving part is used for the FLOAT position and LOWER position.

The hoist system described in Patent Document has a hydraulic circuit configured as shown in FIG. 5. In FIG. 5, there are shown an engine 1 mounted on a vehicle body of a dump truck, hydraulic pumps 2, 3 driven by the engine 1, and hoist cylinders for rotating a vessel up and down. These hoist cylinders 4 are provided as many as two in total, one each on the left and right of the vehicle body of the dump truck. Also shown are 3-position selector valves 5, 6 as main control valves for controlling the hoist cylinders 4. By changing the combination of operation and non-operation of these 3-position selector valves 5, 6 as will be described subsequently herein, they perform RAISE operation, HOLD operation, FLOAT operation and LOWER operation.

There are also shown a RAISE pilot valve 7, a FLOAT pilot valve 8, and a LOWER pilot valve 9. These pilot valves are switched by control signals from a controller (not shown) to supply pilot pressure oil to the 3-position selector valves 5, 6. Also shown are a reducing valve 24 for reducing the pressure of oil, which has been delivered from the hydraulic pump 2, to provide pilot pressure oil, relief valves 10, 11 for preventing overloading of the hoist cylinders 4, and check valves 12, 13 connected in series to the relief valves 10, 11, respectively. There is further shown a variable relief valve 14 for setting a maximum pressure for oil to be delivered from the hydraulic pump 3. This variable relief valve 14 has a pilot pressure receiving part 14a that raises the relief pressure upon a RAISE operation.

In this conventional circuit, the 3-position selector or valves 5, 6 remain in the neutral positions, respectively, while none of the pilot valves 7, 8, 9 is operated. In these neutral positions, circuits 15, 16, which are connected to bottom chambers 4a and rod chambers 4b of the respective hoist cylinders 4, are cut off by the 3-position selector valves 6, 5 so that the vessel is held in the same position.

When the RAISE pilot valve 7 is switched to the low position by the controller from the state shown in the drawing, the 3-position selector valves 5, 6 are both switched to the left positions and at the same time, pilot pressure oil is supplied to the pilot pressure receiving part 14a of the variable relief valve 14, whereby the set pressure of the variable relief valve 14 rises. Then, the oil delivered from the hydraulic pump 3 is supplied to secondary circuits 17, 18 of the 3-position selector valves 5, 6, merges back together at a junction 19, and is supplied to the bottom chambers 4a of the hoist cylinders 4 through the circuit 15. On the other hand, the oil in the rod chambers 4b of the hoist cylinders 4 is returned to an oil tank 21 through the circuit 16, a circuit 20 and the 3-position selector valve 5.

When the FLOAT pilot valve 8 is operated and switched to the low position, on the other hand, only the 3-position selector valve 5 is switched to the right position. The bottom chambers 4a of the hoist cylinders 4 whereby come into communication with the oil tank 21 through the circuits 15, 17 and 3-position selector valve 5. Here, it is to be noted that the rod chambers 4b have already been connected to the oil tank 21 through the circuits 16, 20, the check valve 13 and a circuit 25. It is also to be noted that the rod chambers 4b have already been connected to the oil tank 21 through the circuits 16, 22, check valve 26 and circuit 25. When the hydraulic pressure in the bottom chambers 4a rises by the own weight of the vessel, a portion of the hydraulic oil in the bottom chamber 4a, therefore, circulates to the rod chambers 4b through the circuits 15, 17, 3-position selector valve 5, circuit 25, check valve 13 and circuits 20, 16. At this time, another portion of the working oil, which has flowed out of the 3-position selector valve 5, circulates through the circuit 25, check valve 26 and circuit 22, merges at a junction 23 with oil from the circuit 20, and circulates into the rod chambers 4b. Extra working oil, which occurs by a difference in cross-sectional area between the bottom chambers 4a and the rod chambers 4b, is returned to the oil tank 21. Accordingly, the vessel is allowed to descend.

Further, when the LOWER pilot valve 9 is operated and switched to the low position, only the 3-position selector valve 6 is switched to the right position. The hydraulic oil from the hydraulic pump 3 is whereby supplied to the rod chambers 4b of the hoist cylinders 4 through the 3-position selector valve 6 and circuits 22, 16, and the hydraulic oil in the bottom chambers 4a is drained to the oil tank 21 through the circuits 15, 18 and 3-position selector valve 6. Therefore, the hoist cylinders 4 retract so that the vessel can be forcedly lowered. During this LOWER operation, no pilot pressure is supplied to the variable relief valve 14, so that a hydraulic pressure lower than that at the time of a RAISE operation is applied to the rod chambers 4b.

PRIOR ART DOCUMENTS

Patent Documents

Patent Document 1: JP-A-2001-105954
Patent Document 2: JP-B-4324582

DISCLOSURE OF THE INVENTION

Problem to be Solved by the Invention

In the above-mentioned conventional technologies, the main control valve on the hoist system described in Patent Document 1 is composed of a 4-position selector valve, which is low in the availability on the market and is high in price because its FLOAT position and LOWER position require valve switching in the same direction. Moreover, the pilot pressure which controls this 4-position selector valve has to be set at two levels, so that a high degree of pilot pressure control is needed.

On the other hand, the main control valve described in Patent Document 2 is composed of the two 3-position selector valves 5, 6, thereby making it possible to ensure the availability on the market. However, the combined use of the two 3-position selector valves 5, 6 leads to a greater number of valves, thereby also resulting in a high price. In addition, in the hydraulic circuits through which the two 3-position selector valves 5, 6 and the hoist cylinders 4 are connected together, the respective 3-position selector valves 5, 6 have to be provided with the secondary circuits 17, 18 and these two circuits have to be connected or branched at the junctions 19, 23. The hydraulic circuits are complex, and are expensive.

Further, it is general for the LOWER operation to lower the relief pressure relative to for the RAISE operation. Whichever the configuration of Patent Document 1 or Patent Document 2 is adopted, two relief pressures have to be set by one relief valve in view of the circuit configuration. For setting such two relief pressures, it is general to adopt a configuration that the variable relief valve 14 is used as this relief valve and the pilot pressure to be applied to the variable relief valve 14 is chanced to switch the relief pressure at two levels. The adoption of such a configuration, however, involves a problem that the configuration becomes complex and expensive.

The present invention has, as an object thereof, the provision of a hoist system for a dump truck, which can be realized at lower cost with simpler configuration than conventional hoist systems.

Means for Solving the Problem

A hoist system according to the present invention for a dump truck as a haulage vehicle includes a hydraulic pump that is to be mounted on a vehicle body, hoist cylinders that raises and lowers a vessel, a main control valve that is provided between the hydraulic pump and the hoist cylinders and controls the hoist cylinders, a control device for the hoist cylinders, and a controller that receives a control signal from the control device and controls the main control valve. The hoist system is characterized by comprising:

a main control valve composed of a 3-position selector valve having a HOLD position where the 3-position selector valve cuts off a hydraulic circuit between the heist cylinders and the hydraulic pump and another hydraulic circuit between the hoist cylinders and an oil tank, a RAISE position where the 3-position selector valve supplies hydraulic oil from the hydraulic pump to bottom chambers of the hoist cylinders, and a FLOAT position where the 3-position selector valve communicates the bottom chambers of the hoist cylinders to the oil tank and allows the vessel to descend by an own weight of the vessel, a low-pressure hydraulic pressure source having a hydraulic pressure lower than that of the hydraulic oil that performs a RAISE operation of the vessel, a vessel-lowering control valve provided between the low-pressure hydraulic pressure source and rod chambers of the hoist cylinders, and a check valve that is provided between the rod chambers of the hoist cylinders and the oil tank and enables to supply hydraulic oil from the oil tank to the rod chambers upon a FLOAT operation of the vessel, wherein the controller has a configuration that, when the control signal from the control device is a vessel-lowering signal, the main control valve is switched to the FLOAT position, and also switches the vessel-lowering control valve and supplies hydraulic oil of the low pressure from the low-pressure hydraulic pressure source to the rod chambers of the hoist cylinders.

Advantageous Effects of the Invention

The hoist system according to the present invention for the haulage vehicle uses one 3-position selector valve as the main control valve that controls the hoist cylinders. The 3-position selector valve can be obtained or fabricated more easily at low price or cost than a conventionally-used, 4-position selector valve of extraordinary construction, and can also be obtained or fabricated at lower price or cost than the use of two 3-position selector valves. Moreover, compared with one using a 4-position selector valve of extraordinary construction or two 3-position selector valves as in a conventional hoist system, the main control valve and its associated circuits can be simplified. Therefore, the hoist system according to the present invention can have a simpler configuration and can be provided at lower price than conventional ones.

MODES FOR CARRYING OUT THE INVENTION

Figure 1:
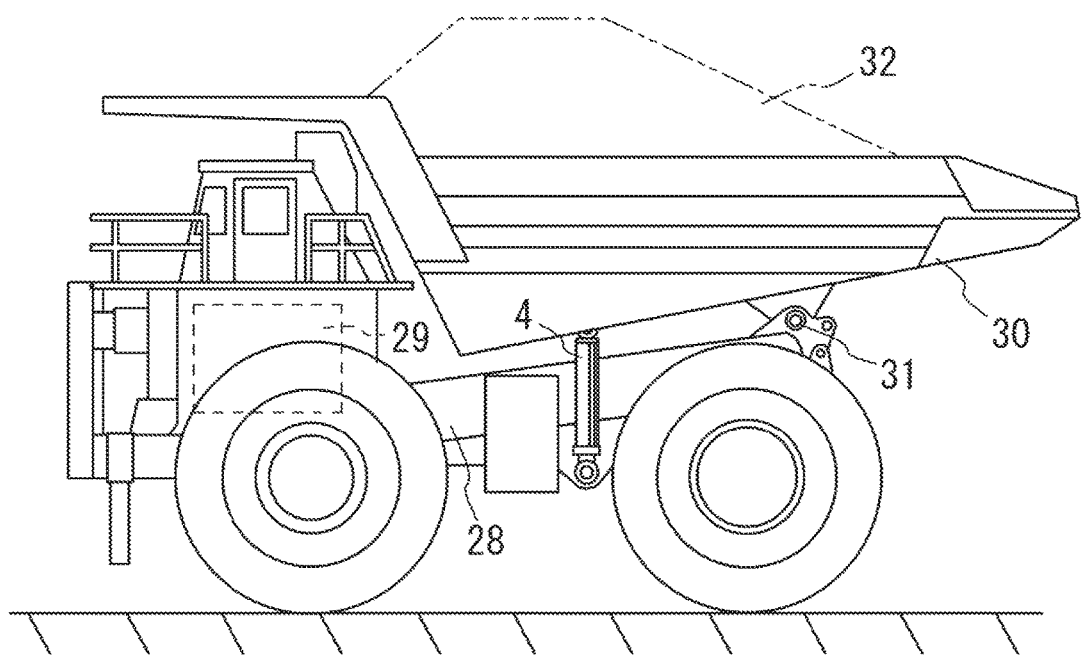
FIG. 1 is a side view showing a dump truck, to which the hoist system according to the present invention is applied, in a posture that its vessel is mounted on a vehicle body.
Figure 2:
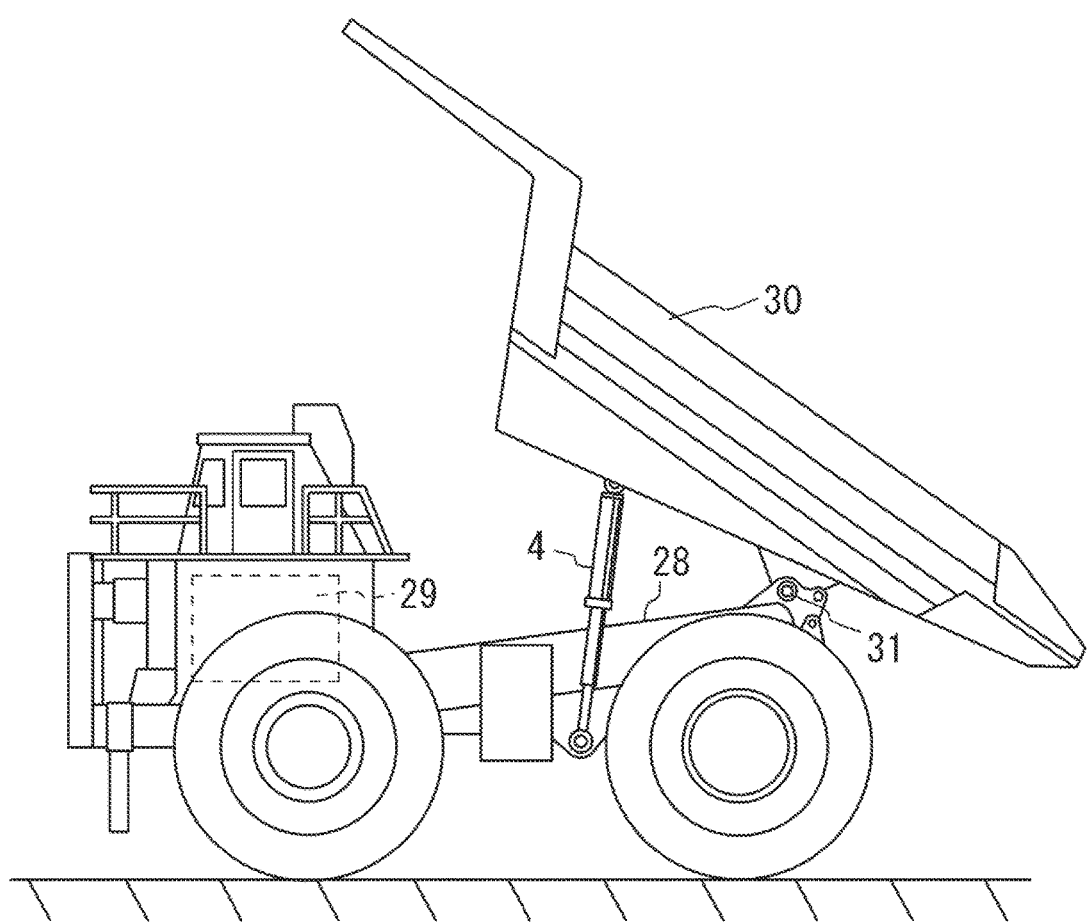
FIG. 2 is a side view showing the dump truck of FIG. 1 with the vessel in a raised position.
Figure 3:
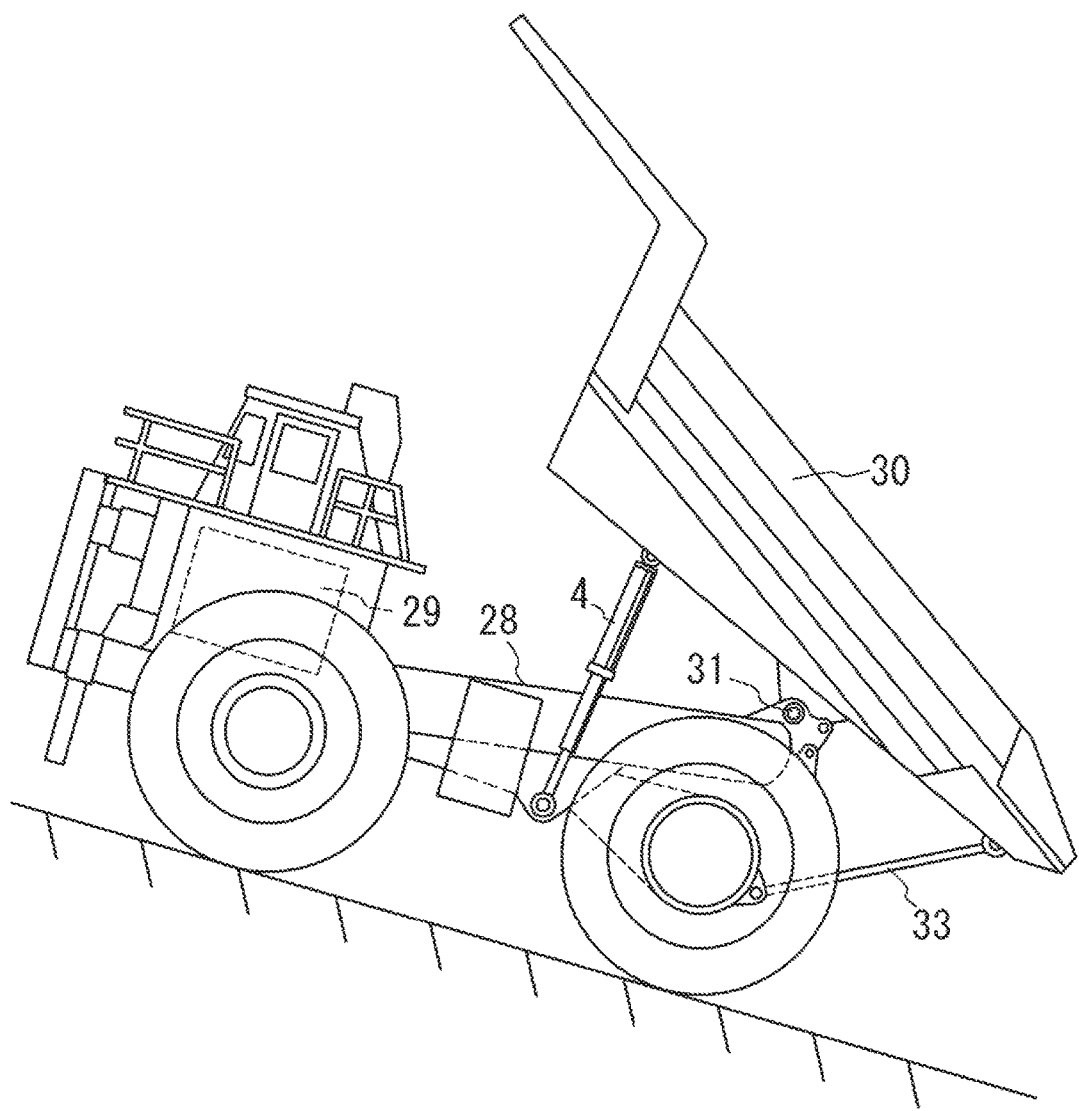
FIG. 3 is a side, view showing the dump truck of FIG. 1 in a state that a LOWER operation of the vessel has become necessary.
Figure 4:
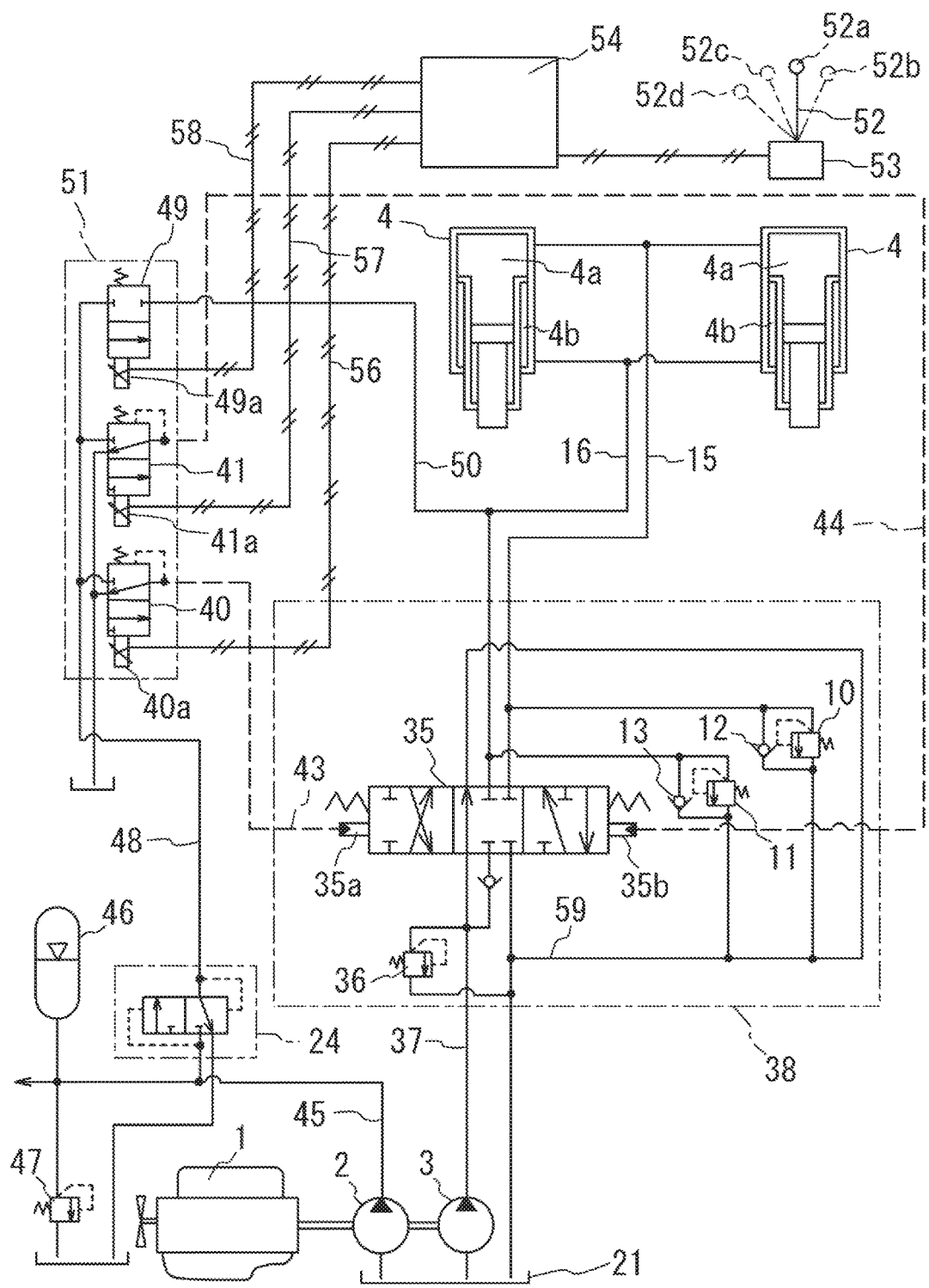
FIG. 4 is a hydraulic circuit diagram showing an embodiment of the hoist system according to the present invention.

FIGS. 1, 2 and 3 are side views showing one example of dump trucks to which the hoist system according to the present invention is applied, and FIG. 4 is a hydraulic circuit diagram showing an embodiment of the hoist system according to the present invention. FIG. 1 shows a state with a vessel 30 mounted on a vehicle body 28, FIG. 2 shows the vessel 30 in a raised state, and FIG. 3 shows the dump truck on an uphill, with the vessel 30 being in the raised state. Shown at 29 is a power source unit mounted on a front section of the vehicle body 28, and this power source unit 29 includes an engine 1, hydraulic pumps 2, 3 and the like, which are shown in the hydraulic diagram of FIG. 4.

There are shown a vessel 30 secured raisably about a pivot portion 31 on a rear part of the vehicle body 28, and a payload 32, such as earth or ore, loaded on the vessel 30. Shown at 4 are hoist cylinders for rotating the vessel 30 up and down, and these hoist cylinders 4 are provided as many as two in total, one each on the left and right, between the vehicle body 28 and the vessel 30. In this embodiment, 3-stage telescopic hoist cylinders are used as the hoist cylinders 4.

With such a dump truck, it is generally on a flat ground or a slight downhill that dumping work is performed with the vessel 30 raised as in FIG. 2. To have the vessel 30 rested on the vehicle body 28 as in FIG. 1 after the dumping, a FLOAT operation, in which rod chambers 4b and bottom chambers 4a (see FIG. 4) of the hoist cylinders 4 are short-circuited to allow the vessel 30 to descend by its own weight, is performed as will be described subsequently herein.

It is when the dump truck takes a tilted posture with the front up on an uphill or the like as shown in FIG. 3 that a need arises for a LOWER operation in which hydraulic oil is supplied to the rod chambers 4b of the hoist cylinders 4 to have the hoist cylinders 4 retracted in FIG. 4. In this case, the vessel 30 is no longer allowed to descend by its own weight when the position of gravity center of the vessel 30 rotates rearward beyond the pivot portion 31. It is, therefore, necessary to lower the vessel 30 to a position, where the vessel 30 is allowed to descend by its own weight, by retracting the hoist cylinders 4.

When a need arises for a LOWER operation of the vessel 30 as mentioned above, the center of gravity of the vessel 30 is located a little, rearward of the pivot portion 31. It is, therefore, necessary to have the hoist cylinders 4 retracted from the above-mentioned state to a posture that the own weight of the vessel 30 can be used as force to lower the vessel 30. The hoist system according to the present invention is, hence, configured by taking into consideration that a lower hydraulic pressure can be set for the LOWER operation than for the RAISE operation.

Figure 5:
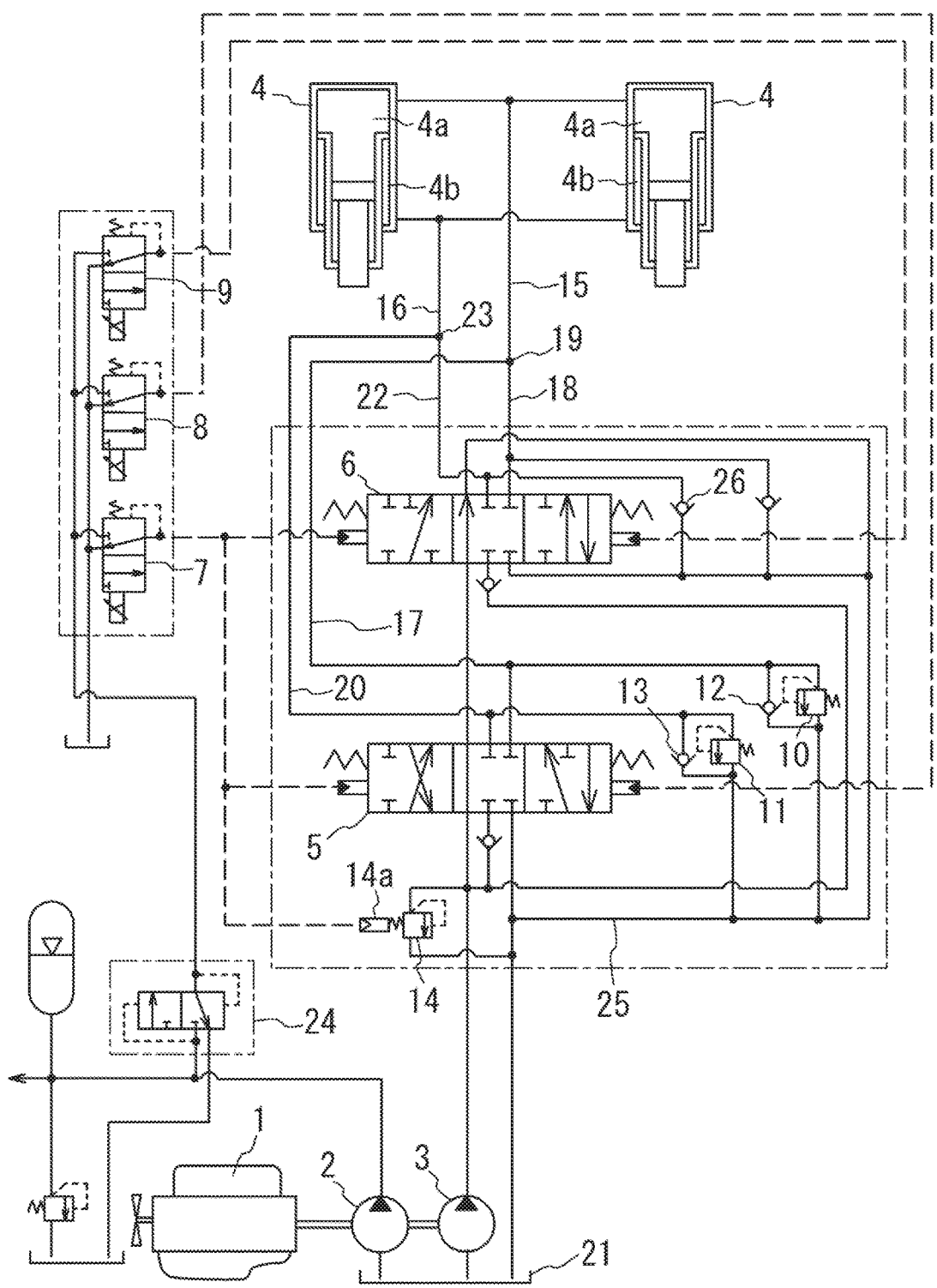
FIG. 5 is a hydraulic circuit diagram showing one example of conventional hoist systems.

Described specifically, the hydraulic pressure to be supplied to the rod chambers 4b of the hoist cylinders 4 can be set lower than the hydraulic pressure to be applied to the bottom chambers 4a upon at RAISE operation. If the hydraulic pressure to be applied to the rod chambers 4b of the hoist cylinders 4 upon a LOWER operation is set higher, the following inconvenience may occur. Specifically, if an operation is performed to lower the vessel 30 by mistakenly applying a high hydraulic pressure to the rod chambers 4b of the hoist cylinders 4 in the state that the vehicle body 28 and a rear end part of the vessel 30 are connected by a block cable 33 with the vessel kept raised for a repair or the like of a component as shown in FIG. 3, the block cable 33 may be cut off. If the vessel 30 is allowed to rest while a high hydraulic pressure is applied to the rod chambers 4b, there is a potential problem that a large impact load may be applied to the vessel 30 and vehicle body 28. As shown in FIG. 5, it has, therefore, been a conventional practice to use the variable relief valve 14 as a relief valve and to set the hydraulic pressure significantly lower upon a LOWER operation than upon a RAISE operation.

The hydraulic circuit of FIG. 4 has been configured with the foregoing in view. In FIG. 4, there is shown a main control valve 35 that performs control of the hoist cylinders 4, and this main control valve 35 is composed of one hydraulically-operated, 3-position selector valve. Shown at 15, 16 are circuits that connect between secondary ports of the main control valve 35 and the bottom chambers 4a and rod chambers 4b of the hoist cylinders 4. There are also shown overload-preventive relief valves 10, 11 provided between the circuits 15, 16 and an oil tank 21, respectively, and check valves 12, 13 connected and provided in parallel to the relief valves 10, 11, respectively. Shown at 36 is a relief valve, which is provided between a delivery circuit 37 of the hydraulic pump 3 and the oil tank 21 and sets a maximum pressure to be applied to the hoist cylinders 4. This relief valve 36 is a relief valve set at a single set pressure. It is to be noted that in this embodiment, the main control valve 35, relief valves 10, 11, check valves 12, 13 and relief valve 36 are configured as one valve unit 38 for space-saving. Upon performing a FLOAT operation of the vessel 30, the check valve 13 enables to supply hydraulic oil from the oil tank 21 to the rod chambers 4b of the hoist cylinders 4.

Shown at 40, 41 are pilot valves for the main control valve 35, and these pilot valves 40, 41 are composed of solenoid-operated proportional control valves having solenoids 40a, 41a, respectively. The pilot valve 40 is a pilot valve for the RAISE operation of the vessel 30, and its secondary port is connected to a pilot pressure receiving part 35a of the main control valve 35 through a pilot circuit 43. The pilot valve 41 is a pilot valve for the FLOAT operation of the vessel 30, and its secondary port is connected to a pilot pressure receiving part 35b of the mat in control valve 35 through a pilot circuit 44.

As a hydraulic pressure source for pilot pressure oil for the main control valve 35 that relays these pilot valves 40, 41, the hydraulic pump 2 different from the hydraulic pump 3 is used. This hydraulic pump 2 is also used as a hydraulic pressure source or the like for a steering system and a brake system in a travel unit of the dump truck. In a delivery circuit 45 of the hydraulic pump 2, an accumulator 46 and a relief valve 47, which sets a maximum pressure for delivered oil, are provided.

This embodiment is configured such that, by providing a reducing valve 24 between the delivery circuit 45 of the hydraulic pump 2 and a primary circuit 48 of the pilot valves 40, 41, pressure oil of a pressure suitable as a pilot pressure is applied from the pilot valve 40 or 41 to the pilot pressure receiving part 35a or 35b of the main control valve 35. It is to be noted that, when the hydraulic pressure to be set at the relief valve 36 is set at 19 MPa, the hydraulic pressures of individual parts, for example, the relief pressures of the relief valves 10, 11 are set at 21 MPa and the secondary hydraulic pressure of the reducing valve 24 are set at 4 MPa. These relief pressures are variously set according to the models or the like of dump trucks.

Shown at 49 is a control valve provided for the LOWER operation of the vessel 30, and this control valve 49 is also composed of a solenoid-operated selector valve having a solenoid 49a. This control valve 49 is connected at a primary port thereof to the primary circuit 48 of the pilot valves 40, 41. On the other hand, a secondary port of this control valve 49 is connected to the circuit 16, which is connected to the rod chambers 4b of the hoist cylinders 4, by a circuit 50. It is to be noted that in this embodiment, the pilot valves 40, 41 and control valve 49 are configured as one valve unit 51 for space-saving, Shown at 52 is a control lever that constitutes a control device for controlling the pilot valves 40, 41 and vessel-lowering control valve 49. Shown at 53 is a lever sensor that detects and outputs a manipulated position and stroke of the control lever 52. Shown at 54 is a controller that controls the main control valve 35 by an output signal from the lever sensor 53 via the pilot valves 40, 41 and control valve 49.

The control lever 52 takes, as manipulated positions, a neutral, vessel HOLD position designated at 52a, a RAISE position designated at 52b, a FLOAT position 52c as a manipulated position on a side opposite to the RAISE position 52b with respect to the neutral HOLD position as a center, and a LOWER position 52d with a further increased stroke in the same direction as the FLOAT position 52c. There are manipulation angle ranges at the individual positions 52b, 52c, 52d, and the lever sensor 53 outputs a detection signal of a manipulated position and a control signal, which corresponds to a stroke, to the controller 54. The controller 54 receives the signals from the lever sensor 53, and applies control signals (a current), which correspond to the manipulated position and stoke of the control lever 52, to the solenoid 40a or 41a and solenoid 49a of the pilot valve 40 or 41 and control valve 49 via a signal line 56 or 57 and signal line 58 to perform the switching and the control of flow passage openings of the valve 40 or 41 and valve 49.

In FIG. 4, when the control lever 52 is at the neutral HOLD position 52a, no control signals are applied from the controller 54 to the solenoids 40a, 41a, 49a of the pilot valves 40, 41 and control valve 49 so that these valves 40, 41, 49 are in the cut-off positions shown in the drawing. At this time, the main control valve 35 is in the neutral position, the rod chambers 4b of the hoist cylinders 4 are cut off relative to the hydraulic pump 3 and oil tank 21, and the vessel 30 holds the current posture.

When the control lever 52 is manipulated to the RAISE position 52b, the controller 54 delivers a control signal to the solenoid 40a of the pilot valve 40 via a signal line 56 so that the pilot valve 40 is switched to the low position. Pilot pressure oil, which has been produced by a reduction in pressure through the reducing valve 24, is whereby supplied to the pilot pressure receiving part 35a of the main control valve 35, and the main control valve 35 is switched to the left position. As a result, the hydraulic oil from the hydraulic pump 3 is supplied to the bottom chambers 4a of the hoist cylinders 4 through the main control valve 35 and circuit 15, the hoist cylinders extend, and the vessel 30 ascends. The maximum pressure at this time is the relief pressure set by the relief valve 36.

It is to be noted that the pivot portion 31 of the vessel 30 is provided with an angle sensor (not shown) that detects a tilt of the vessel relative to the vehicle body 28. When this angle sensor detects an angle that is close to an upper limit angle of the vessel, the controller 54 restricts the flow passage opening of the pilot valve 40. The flow passage opening of the main control valve 35 is whereby restricted to make slower the extension speed, of the hoist cylinders 4, so that an impact upon reaching of the vessel 30 to its upper limit is reduced.

When the control lever 52 is manipulated to the FLOAT position 52c, on the other hand, the controller 54 delivers a control signal to the solenoid 41a of the pilot valve 41 via a signal line 57 so that the pilot valve 41 is switched to the low position. Pilot pressure oil, which has been reduced in pressure through the reducing valve 24, is whereby supplied to the pilot pressure receiving part 35b of the main control valve 35, and the main control valve 35 is switched to the right position. As a result, the circuit between the delivery circuit 37 of the hydraulic pump 3 and the circuit 15, which leads to the bottom chambers 4a of the hoist cylinders 4, is cut off at the main control valve 35, and at the same time, the circuit 15 which leads to the bottom chambers 4a comes into communication with the oil tank 21 through the main control valve 35.

Further, the circuit 16 which leads to the rod chambers 4b of the hoist cylinders 4 has basically been connected to the oil tank 21 through the check valve 13 and a circuit 59. By a hydraulic pressure produced in the bottom chambers 4a by the own weight of the vessel 30, the hydraulic oil in the bottom chambers 4a is, therefore, circulated to the rod chambers 4b through the circuit 15, the main control valve 35, the circuit 59 leading to the oil tank 21, and the check valve 13. In addition, a portion of the hydraulic oil which has flowed out of the bottom chambers 4a flows out by a difference in cross-sectional area between the bottom chambers 4a and the rod chambers 4b. The vessel 30 is whereby allowed to descend by its own weight. Also upon this descent, when the vessel 30 comes to a state close to a resting posture, the controller 54 restricts the flow path opening of the pilot valve 41 to restrict the flow path opening of the main control valve 35 so that the retracting speed of the hoist cylinders 4 is made slower to reduce an impact of resting.

When the control lever 52 is manipulated to the LOWER position 52d, the controller 54 delivers a control signal, which is an electric current corresponding to the stroke of the control lever 52, to the solenoids 41a, 49a of the respective pilot valve 41 and control valve 49 via the signal line 57 and a signal line 58, the pilot valve 41 and control valve 49 are thereby switched to the low positions so that they have flow path openings corresponding to the control current. As a result, the main control valve 35 is switched to the FLOAT position as the right position, and therefore the bottom chambers 4a come into communication with the oil tank 21 via the main control valve 35. At the same time, hydraulic oil of a low pressure from the reducing valve 24 is supplied from the control valve 49 to the rod chambers 4b of the hoist cylinders 4 through the circuit 50 and circuit 16. Therefore, the hoist cylinders 4 retract, and the vessel 30 can be lowered even if as shown in FIG. 3, the dump truck is on an uphill and the center of gravity of the vessel 30 is located rearward of the pivot portion 31.

It is to be noted that, if the hydraulic pressure of the rod chambers 4b is extremely low or becomes a negative pressure upon this LOWER operation, the pilot pressure to be applied to the pilot pressure receiving part 35b of the main control valve 35 also decreases and the main control valve 35 is also returned toward the neutral position and becomes no longer possible to remain at the right position as the FLOAT position. However, the hydraulic pressures in the rod chambers 4b and pilot pressure receiving part 35b increase again insofar as the pilot valve 41 and control valve 49 have been switched to the low positions. By these hydraulic pressures, the main control valve 35 hence repeats the operation of returning toward the right position, so that the LOWER operation is performed without interruption actually.

As described above, the hoist system of this embodiment uses one 3-position selector valve as the main control valve 35 that controls the hoist cylinders 4. The 3-position selector valve can be obtained or fabricated more easily at low price or cost than a conventionally-used, 4-position selector valve of extraordinary construction, and can also be obtained or fabricated at lower price or cost than the use of two 3-position selector valves as in the conventional hoist systems. Moreover, compared with one using a 4-position selector valve of extraordinary construction or two 3-position selector valves as in a conventional hoist system, the main control valve and its associated circuits can be simplified. Therefore, the hoist system according to the present invention can have a simpler configuration and can be provided at lower price than conventional ones.

In this embodiment, the hydraulically-operated selector valve is used as the main control valve 35, and, as the low-pressure hydraulic pressure source that supplies hydraulic oil of a low pressure to the rod chambers 4b of the hoist cylinders 4 via the vessel-lowering control valve 49, the hydraulic pressure source for pilot pressure oil to the main control valve 35 is used. It is, therefore, not necessary to newly provide an additional low-pressure hydraulic pressure source as a vessel-lowering, low-pressure hydraulic pressure source. The configuration is therefore simplified further.

In this embodiment, the relief valve 36 with the single relief pressure set is provided as a relief valve that sets the maximum pressure of hydraulic oil to be delivered from the hydraulic pump 3 to actuate the hoist cylinders 4. Compared with a case where a variable relief valve is used as in the conventional hoist systems, the hoist system can be simplified in configuration and can be provided at a still lower price.

When practicing the present invention, various modifications and/or additions are feasible, without being limited to the above-described embodiment, within a range not departing from the concept of the present invention, such as using, as a prime mover for driving the hydraulic pumps 2, 3, an electric motor, which receives a supply of electricity from overhead lines via pantographs, instead of the engine 1.

LEGENDS

1: engine, 2, 3: hydraulic pump, 4: hoist cylinder, 4a: bottom chamber, 4b: rod chamber, 10, 11: relief valve, 12, 13: check valve, 24: reducing valve, 28: vehicle body, 29: power source unit, 30: vessel, 31: pivot portion, 35: main control valve, 36: relief valve, 40: RAISE pilot valve, 41: FLOAT pilot valve, 49: LOWER control valve, 52: control lever, 52a: HOLD position, 52b: RAISE position, 52c: FLOAT position, 52d: LOWER position, 53: lever sensor, 54: controller

The invention claimed is:

1. A hoist system for a dump truck, said hoist system including a hydraulic pump that is to be mounted on a vehicle body, a hoist cylinder that raises and lowers a vessel, a main control valve that is provided between the hydraulic pump and the hoist cylinder and controls the hoist cylinder, a control device for the hoist cylinder, and a controller that receives a control signal from the control device and controls the main control valve, which hoist system comprises:

the main control valve, composed of a 3-position selector valve having a HOLD position where the 3-position selector valve cuts off a hydraulic circuit between the hoist cylinder and the hydraulic pump and another hydraulic circuit between the hoist cylinder and an oil tank, a RAISE position where the 3-position selector valve supplies hydraulic oil from the hydraulic pump to a bottom chamber of the hoist cylinder, and a FLOAT position where the 3-position selector valve communicates the bottom chamber of the hoist cylinder to the oil tank and allows the vessel to descend by an own weight of the vessel, a low-pressure hydraulic pressure source having a hydraulic pressure lower than that of the hydraulic oil that performs a RAISE operation of the vessel, a vessel-lowering control valve provided between the low-pressure hydraulic pressure source and a rod chamber of the hoist cylinder, and a check valve that is provided between the rod chamber of the hoist cylinder and the oil tank and enables to supply hydraulic oil from the oil tank to the rod chamber upon a FLOAT operation of the vessel, wherein the controller has a configuration that, when the control signal from the control device is a vessel-lowering signal, the main control valve is switched to the FLOAT position, and also switches the vessel-lowering control valve and supplies hydraulic oil of low pressure from the low-pressure hydraulic pressure source to the rod chamber of the hoist cylinder.

2. The hoist system according to claim 1, wherein:

the main control valve is composed of a hydraulically-operated selector valve, as the low-pressure hydraulic pressure source to be used upon a vessel-lowering operation, a hydraulic pressure source that supplies pilot pressure oil to the main control valve is used.

3. The hoist system according to claim 1, wherein:

the hoist system includes a relief valve which sets a maximum pressure for the hydraulic oil that is delivered from the hydraulic pump and actuates the hoist cylinder as a unique relief pressure.

\* \* \* \* \*